US012623776B2

(12) United States Patent
Dolejsi et al.

(10) Patent No.: US 12,623,776 B2
(45) Date of Patent: May 12, 2026

(54) FREE WING MULTIROTOR TRANSITIONAL S/VTOL AIRCRAFT

(71) Applicant: Autonomous Flight Systems Inc., Delta (CA)

(72) Inventors: Edward Dolejsi, Delta (CA); Daniel Heim, Vancouver (CA)

(73) Assignee: Autonomous Flight Systems Inc., Delta (CA)

( * ) Notice: Subject to any disclaimer, the term of this patent is extended or adjusted under 35 U.S.C. 154(b) by 0 days.

(21) Appl. No.: 17/710,874

(22) Filed: Mar. 31, 2022

(65) Prior Publication Data

US 2022/0363376 A1     Nov. 17, 2022

Related U.S. Application Data

(60) Provisional application No. 63/170,540, filed on Apr. 4, 2021.

(51) Int. Cl.
B64C 29/00          (2006.01)
B64C 39/08          (2006.01)

(52) U.S. Cl.
CPC .......... B64C 29/0033 (2013.01); B64C 39/08 (2013.01)

(58) Field of Classification Search
CPC ............ B64C 29/0008; B64C 29/0033; B64C 39/08; B64C 3/385
See application file for complete search history.

(56) References Cited

U.S. PATENT DOCUMENTS

| | | | |
|---|---|---|---|
| 2,708,081 A | 5/1955 | Dobson | |
| 3,029,043 A | 4/1962 | Churchill | |
| 3,181,810 A * | 5/1965 | Olson | B64C 29/0033 244/66 |
| 3,430,894 A | 3/1969 | Strand et al. | |
| 3,934,843 A * | 1/1976 | Black | B64C 29/0033 244/7 C |
| 4,967,984 A * | 11/1990 | Allen | B64C 3/385 244/45 R |
| 5,086,993 A | 2/1992 | Wainfan | |
| 5,280,863 A | 1/1994 | Schmittle | |
| 5,395,073 A | 3/1995 | Rutan et al. | |

(Continued)

FOREIGN PATENT DOCUMENTS

WO      WO-2016004852 A1 *   1/2016   ............. B64C 29/00

*Primary Examiner* — Ashesh Dangol
(74) *Attorney, Agent, or Firm* — Capitol City TechLaw, PLLC; Samuel P. Burkholder

(57)          ABSTRACT

An improved aircraft design to harness advantages of vertical or short-takeoff and landings (V/STOL) and efficient horizontal flight is disclosed. The aircraft design includes multiple thrust sources and wings which are free to rotate on a spanwise axis, and have their center of gravity aft of the axis of rotation. Wing rotation is decoupled from both the fuselage and the thrust sources. Wings are coupled to each other such that rotation induced in one wing affects rotation in all wings. Thrust sources are directed vertically during hover and some degree forward of vertical for horizontal flight. The disclosed configuration improves aircraft flight stability and efficiency in all flight profiles: vertical flight, transition to/from horizontal flight, and horizontal flight. The aircraft has the possibility of a controlled emergency landing using autorotation of the propellers, wings or a combination of the two.

19 Claims, 4 Drawing Sheets

(56)  References Cited

U.S. PATENT DOCUMENTS

| | | | |
|---|---|---|---|
| RE36,487 | E | 1/2000 | Wainfan |
| 6,863,241 | B2 | 3/2005 | Sash |
| 8,505,846 | B1 | 8/2013 | Sanders, II |
| 8,567,709 | B2 | 10/2013 | Dudley et al. |
| 10,589,838 | B1 * | 3/2020 | Suppes ................. B64D 35/04 |
| 11,242,142 | B1 | 2/2022 | Sanders, II |
| 11,254,430 | B2 | 2/2022 | Regev |
| 2004/0075017 | A1 * | 4/2004 | Sash ................... B64C 29/0033 |
| | | | 244/10 |
| 2018/0370626 | A1 * | 12/2018 | Zachary ............... B64C 39/024 |
| 2019/0084684 | A1 * | 3/2019 | Eller ...................... B64D 27/24 |
| 2019/0291859 | A1 * | 9/2019 | Manning ............... B64U 50/19 |
| 2020/0164975 | A1 * | 5/2020 | Robertson .............. B64C 29/00 |
| 2021/0171191 | A1 * | 6/2021 | Castellano Aldave ...................... |
| | | | B64U 30/14 |
| 2021/0371096 | A1 * | 12/2021 | Anderson .............. B64C 3/385 |
| 2022/0315214 | A1 * | 10/2022 | Mitani ................... B60L 58/21 |

* cited by examiner

FREE WING MULTIROTOR TRANSITIONAL S/VTOL AIRCRAFT

RELATED US APPLICATION DATA

Provisional Patent No. 63/170,540, filed Apr. 4, 2021

FIELD OF SEARCH

B64C29/0025, B64C27/52 244/7R, 244/17.25, 244/6.

US PATENT DOCUMENTS CITED

| | | |
|---|---|---|
| 2,708,081 | May 1955 | Dobson |
| 3,029,043 | April 1962 | Churchill |
| 3,430,894 | March 1969 | Strand, et al |
| 3,934,843 | January 1976 | Black |
| 4,967,984 | November 1990 | Allen |
| 5,086,993 | February 1992 | Wainfan |
| 5,280,863 | January 1994 | Schmittle |
| 5,395,073 | March 1997 | Rutan, et al |
| RE 36,487 | January 2000 | Wainfan |
| 6,863,241 | March 2005 | Sash |
| 8,505,846 | August 2013 | Sanders, II |
| 8,567,709 | October 2013 | Dudley et al |
| 10,589,838 | March 2020 | Supes |
| 11,242,142 | February 2022 | Sanders II |
| 11,254,430 | February 2022 | Regev |

OTHER PUBLICATIONS CITED

"Wind Tunnel Tests of a Free-Wing Tilt-Propeller V/STOL Airplane Model". T. Strand, E. S. Levinsky, Technical Report AFFDL-69-80, October 1969

"Investigation of the Applicability of the Free-wing Principle to Light, General Aviation Aircraft". Richard F. Porter et al., NASA CR-246 June 1972

"Experimental Investigation of Stability and Stall Flutter of a Free-floating Wing V/Stol Model". Robert A. Ormiston; NASA TN D-6831 June 1972

"Flight Tests of a Radio-controlled Airplane Model with a Free-wing, Free-canard Configuration". Shu W. Gee, Samuel R. Brown, NASA TM-72853, March 1978

"Extended Analytical Study of the Free-wing/Free-trimmer Concept". Richard F. Porter, et al., NASA Contractor Report 3135, 1979

TECHNICAL FIELD

The present invention relates generally to short field and vertical take-off and landing (STOL/VTOL) aircraft and, more particularly, to a STOL/VTOL aircraft, capable of transitioning to efficient horizontal flight.

BACKGROUND

Heavier than air flight is an industry with a century long history of innovation. The commercial success of aircraft attests to the usefulness of air transport. The majority of aircraft in production today fall into one of two types: (1.) airplanes with fixed wings and rotors aligned horizontally to provide efficient long-range flight and, (2.) rotorcraft with rotor aligned vertically providing efficient vertical flight and hover capability.

A third type of aircraft design is pursued by inventors, corporate and government entities since the mid twentieth century; aircraft capable of vertical take-off and transitioning to horizontal flight on wing. This type of aircraft is given many names: convertiplane, transitional aircraft or, VTOL. The great number of widely varying designs is a testament to the ingenuity of the inventors working in this field. Designs include: twin tilt rotors and tilt wings; tandem or multiple wings and/or tilt rotors and tilt wings; aircraft with separate lift and thrust rotors. Some of these aircraft have found niche markets; the V22 Osprey—a twin tilt rotor with single wing—is currently in use by a number of military organizations. However, transitional aircraft have yet to be fully embraced by the flying public or found wide commercial success.

Stability through the transition from vertical flight to horizontal flight is a main issue for transitional aircraft. Aerodynamic instability in these aircraft arise in part as a result of wings that are coupled with rotors and fuselage. Any disturbance to the attitude/pitch affects both the wing lift, and airspeed of the aircraft. A wind gust, or pilot input, pitching the aircraft nose up momentarily increases lift and drag on the wing. Subsequently, the aircraft slows, loses lift and pitches down. In this attitude drag is reduced, velocity increases. An oscillation results until longitudinal stability is re-established, or control becomes unrecoverable. If a disturbance occurs at low airspeeds, close to ground—during take-off or landing, for example—the initiation of such an oscillation can have undesirable consequences; a bounce, hard landing or even crash.

Recent advances in technologies such as, electronic stabilization and auto pilot control are able to somewhat overcome the lack of stability these aircraft exhibit during the transition flight envelop. However, without inherent aerodynamic stability, transitional aircraft are likely to continue to find resistance to acceptance and, lack a broader commercial market as well as, difficulty in achieving regulatory approval.

SUMMARY OF INVENTION

The current invention discloses an improved aircraft design. The aircraft is of the VTOL/STOL (Vertical Take-Off and Landing/Short-field Take-Off and Landing) type. The aircraft is capable of vertical take-off; transitioning to, and back, from efficient horizontal flight on wings. The most important attribute of the aircraft is stability throughout all regimes of flight: hover, transition, slow flight and, horizontal flight. Through a combination of gliding on wings and autorotation of the rotors, the design also makes possible safe, unpowered, emergency landings.

The current specification discloses an improved aircraft design to harness advantages of vertical or short-takeoff and landings (V/STOL) and efficient horizontal flight. The disclosed configuration improves aircraft flight stability and efficiency in all three flight profiles: vertical flight, transition to and from horizontal flight, and horizontal flight on wings. The disclosed aircraft is capable of stable flight at any airspeed from hover to its maximum designed speed. It has the possibility of a controlled emergency landing using autorotation, or wings, or a combination of the two. The disclosed aircraft design includes multiple thrust sources, and wings that are free to rotate on a spanwise axis. Wing rotation is independent, not coupled, with either the fuselage, or the thrust sources. Wing configurations include single, tandem, or multiple sets. Wings are coupled to each other in such a way that rotation induced in one wing affects rotation in all wings. Thrust sources are directed vertically during hover and some degree forward of vertical for horizontal flight. Thrust sources for vertical and horizontal flight can be the same rotors, such as in tilt-rotor configurations, or divided between vertical flight rotors and horizontal flight rotors, such is in lift and cruise (also known as lift and thrust) configurations.

The present teachings are directed to an aircraft comprising wings, fuselage, vertical stabilizer, and multiple thrust producing rotors having a method to change a thrust direction from vertical to horizontal. The wing sets can be single, tandem or multiple sets series, and can be mounted on same structure as the rotors or on separate spars. The wings are free to rotate on a span wise axis. The wings are coupled with each other in such that a rotation induced in one wing affects all the other wings. The wings are balanced with the center of mass some distance behind the axis of rotation.

The aircraft further comprises thrust producing rotors configured with 3 or more propellers, and configured in a geometry to provide the stability of a multi-rotor type aircraft. The thrust producing rotors are mounted on structures attached to the fuselage, and the thrust from the rotors are variable through change in individual propeller pitch or change in individual rotor rpm.

Stability in vertical flight is achieved through variation of thrust from different rotors, and stability in transitional and slow flight is achieved through a combination of variation in the thrust of different rotors and the characteristics of freely rotating wings.

The control of flight in the horizontal direction is achieved either through aerodynamic control surfaces or vector thrust of the rotors. The thrust producing rotors are separated in the horizonal plane with a geometry to maximize vertical flight stability.

The propellers are configured to 1) tilt or rotate through a range of motion, 2) vertical flight rotors with separate horizontal propeller, or 3) combination of the two above configurations.

The method to drive the rotors which may include but not limited to 1) electric drive, 2) hydraulic drive, 3) mechanical drive from an internal combustion engine, or 4) some combination of the three above drives.

The presently disclosed fuselage maintains a generally horizontal attitude throughout all flight regimes, and contains power systems, fuel, and payload.

The presently disclosed aircraft comprises wings mounted between parallel booms and the propellers, and drives mounted on spars outside the booms, or on the booms.

In the presently disclosed aircraft, the wing rotation is restricted by mechanical or electronic means within a maximum and minimum range. The wings are separated in the horizontal plane such that the aft mounted wing is either higher or lower from the centreline than the front wing.

The propellers are variable pitch in the presently disclosed aircraft.

The disclosed aircraft can have wings that do not extend to the full span of the spar, such that the wings are not in the airflow of the propeller.

In the presently disclosed aircraft, the wings can be coupled electronically.

In the presently disclosed aircraft, the relative angle of attack of the fore and aft wings can be adjusted.

In the presently disclosed aircraft, the relative angle of attack of the left and right wings can be adjusted.

In some embodiments of the presently taught aircraft, the aircraft can comprise 2 or more wings mounted between twin booms with propellers mounted in a multirotor configuration so that propwash from the propellers do not spill over the wings.

The improved aircraft configuration can be applied to all modes of power currently used in aircraft including, but not limited to internal combustion, battery, or hybrid drive systems. Motors driving rotors can be electric, internal combustion direct drive, hydraulic, or mechanical drive from a central power source.

Propellers can be of fixed pitch or variable pitch, dependent on the desired flight characteristics of the aircraft.

Efficient hover is accomplished by minimizing aircraft structure and components in thrust airstream, or by positioning wings in a chord vertical attitude, creating a minimum profile with respect to thrust airstream. Configurations of the aircraft can carry significant payload and, have range comparable or exceeding current aircraft of similar function.

The present invention encompasses the configuration and components necessary to achieve an aerodynamic stable transitional aircraft in all regimes of flight: vertical flight; transition to and from horizontal flight; and, horizontal winged flight.

The invention is comprised of a fuselage, several thrust producing rotors, wings, and a vertical stabilizer. In single wing configurations a horizontal stabilizer is required.

The aircraft fuselage is meant to be maintained in a generally horizontal attitude through all flight profiles from vertical to horizonal flight. However, deviation of the fuselage from horizontal does not affect the stability of the configuration.

There are 3, 4 or more thrust producing rotors. Rotors are mounted on support structures extending from the fuselage, or may be part of the fuselage. Rotors are geometrically arranged to provide a stable hovering platform in vertical flight. The arrangement of rotors is similar to what is commonly used in what is called multirotor, or multicopter. Variants of multicopters are variously known as tricopter, (3 rotors), quadcopter (4 rotors), hexacopter (6 rotors), octacopter (8 rotors) and so on. The present invention incorporates the same mechanisms as multicopters for hover stability. Thus, it is achieved through differential thrust (change in motor power or propeller pitch), vector thrust (change in thrust direction) or combination of differential and vector thrust. In this manner pitch, roll, yaw, lateral, longitudinal and altitude are fully controllable.

Furthermore, the invention incorporates single, tandem or multiple wings that freely rotate around a spanwise axis. The axis of the wing may also be the structure mounting the rotors. However, it is also possible to have separate structures from the wings to mount the rotors. An example of where separation of rotor structure and wing axis is most likely is in single wing configurations with rotors mounted on spars fore and aft of a single wing mounted on axis near the center of mass of the aircraft.

For the freely rotating wings to produce lift an appropriate airfoil and shape must be chosen. The current invention recommends a reflexed airfoil, other airfoils that are capable of producing lift in free rotating wings are possible. During forward flight, airflow over the wing aerodynamically lifts the wing into an attitude that induces a lift on the spar. The sets of wings are mechanically, or electronically linked such that rotation of a one wing is coupled to all other wings. By changing the length of the mechanical linkage, lift during flight can be shifted between forward and aft wing sets. Change of fore/aft wing lift can be used to accommodate differences in the location of center of mass caused by payload position in the fuselage. External forces (such as wind gusts or sheer) acting on a wing cause rotation of all wings simultaneously. However, wings are not coupled with either the rotor tilting mechanism or the fuselage. Therefore, forces acting on the wings are not transferred to either the tilting rotors, or fuselage; and vice versa. This lack of coupling of wings to thrust producing rotors is key to this invention.

Decoupling the forces acting on the wing from both the fuselage attitude and, tilting rotor mechanism-create aerodynamic stability in transitional and horizontal flight. Multiple rotors arranged in a geometric plane provide stable vertical flight. Hence the aircraft achieves stability in all three flight regimes.

Although, the invention presents a tilt rotor configuration, using this freely rotating wing configuration will work equally well with lift and thrust and, hybrid tilt rotor/lift and thrust configurations.

DETAILED DESCRIPTION OF THE DRAWINGS

Figure 1:
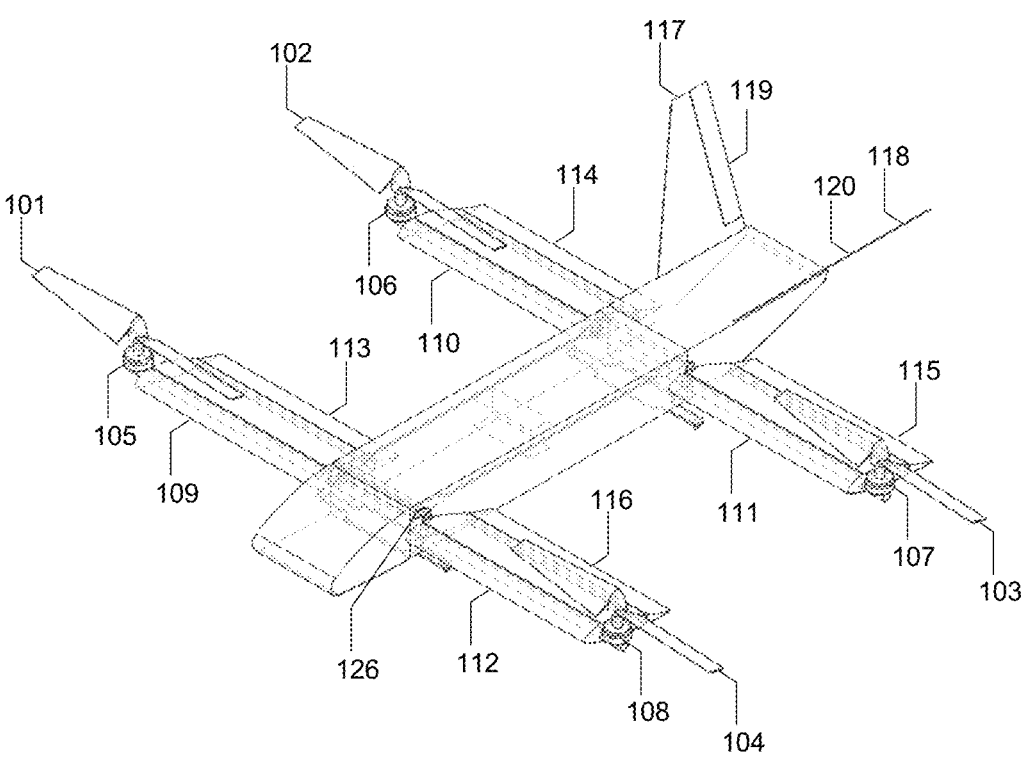
FIG. 1. Orthogonal view of aircraft with propellers positioned for vertical flying.
Figure 2:
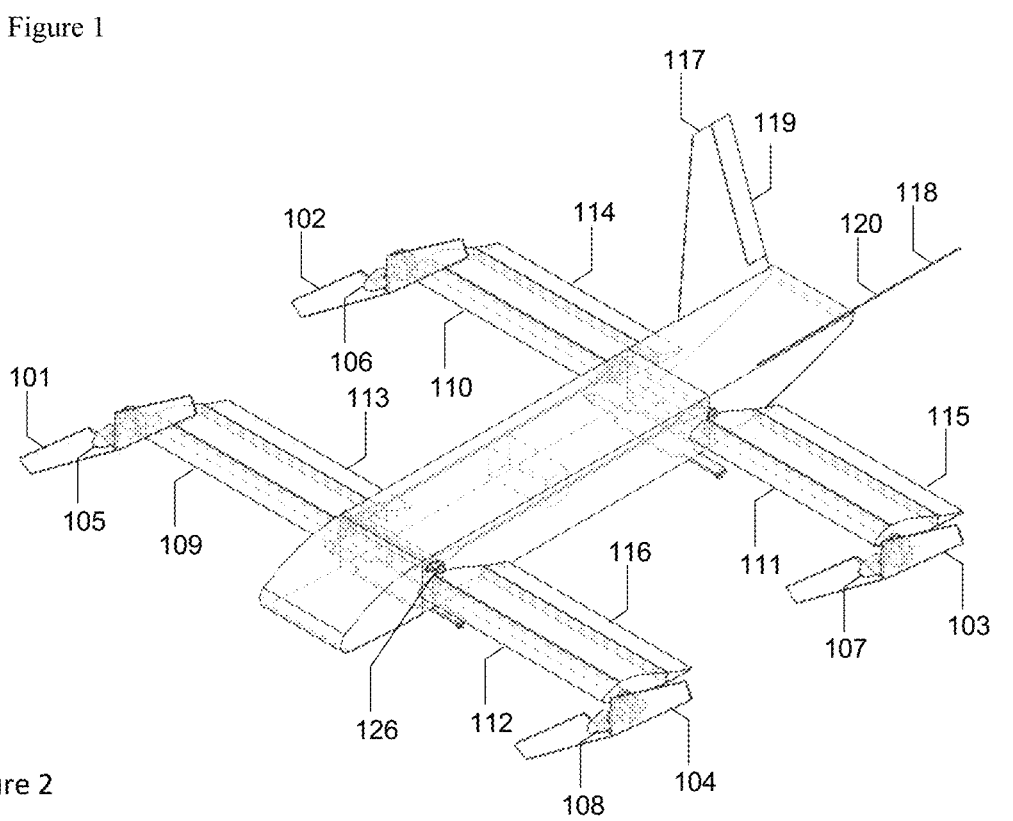
FIG. 2. Orthogonal view of aircraft with propellers positioned for horizontal flying.
Figure 3:
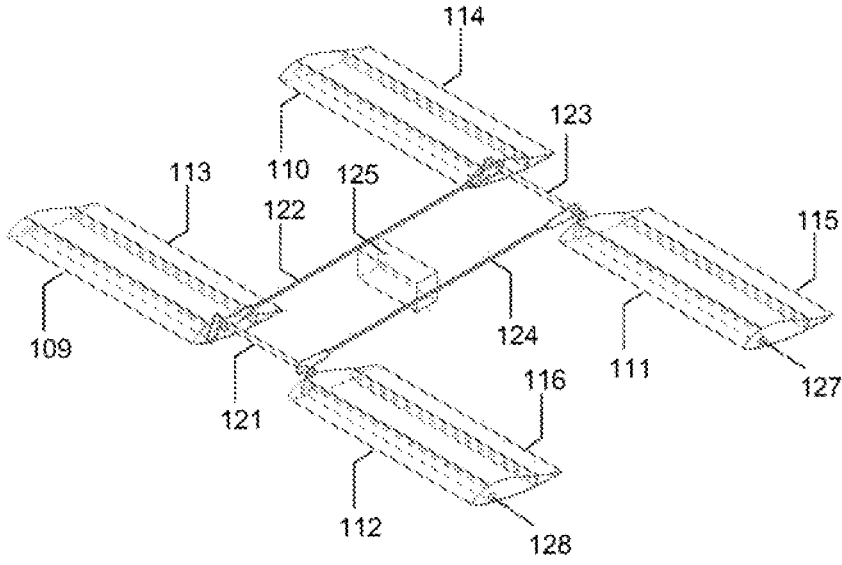
FIG. 3. Orthogonal view of aircraft, detail showing wing coupling.
Figure 4:
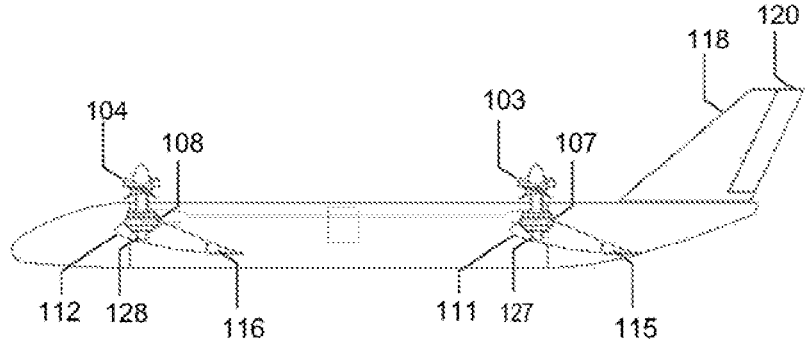
FIG. 4. Side view of aircraft with propellers positioned for vertical flying.
Figure 5:
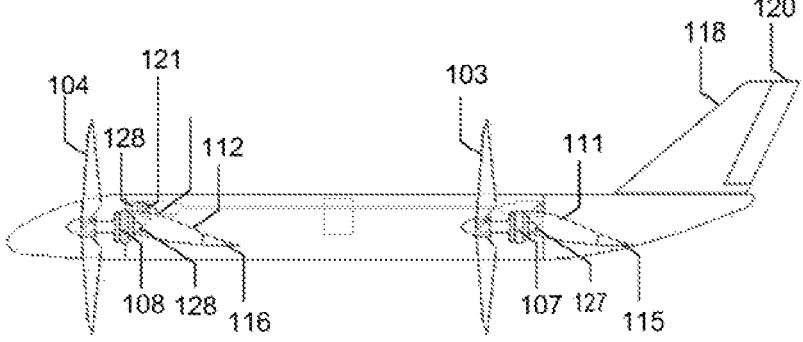
FIG. 5. Side view of aircraft with propellers positioned for horizontal flying.
Figure 6:
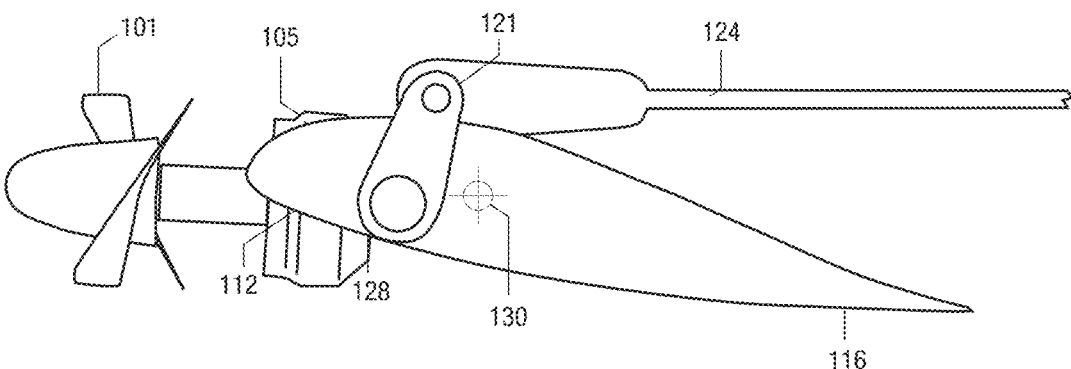
FIG. 6. Side view of forward wing in horizontal flying mode, detail showing coupling, center of mass approximate position behind axis of rotation. With horizontal airflow over its surface the wing has in a generally horizonal attitude. Motor's rotation is independent from wing which rotates freely.
Figure 7:
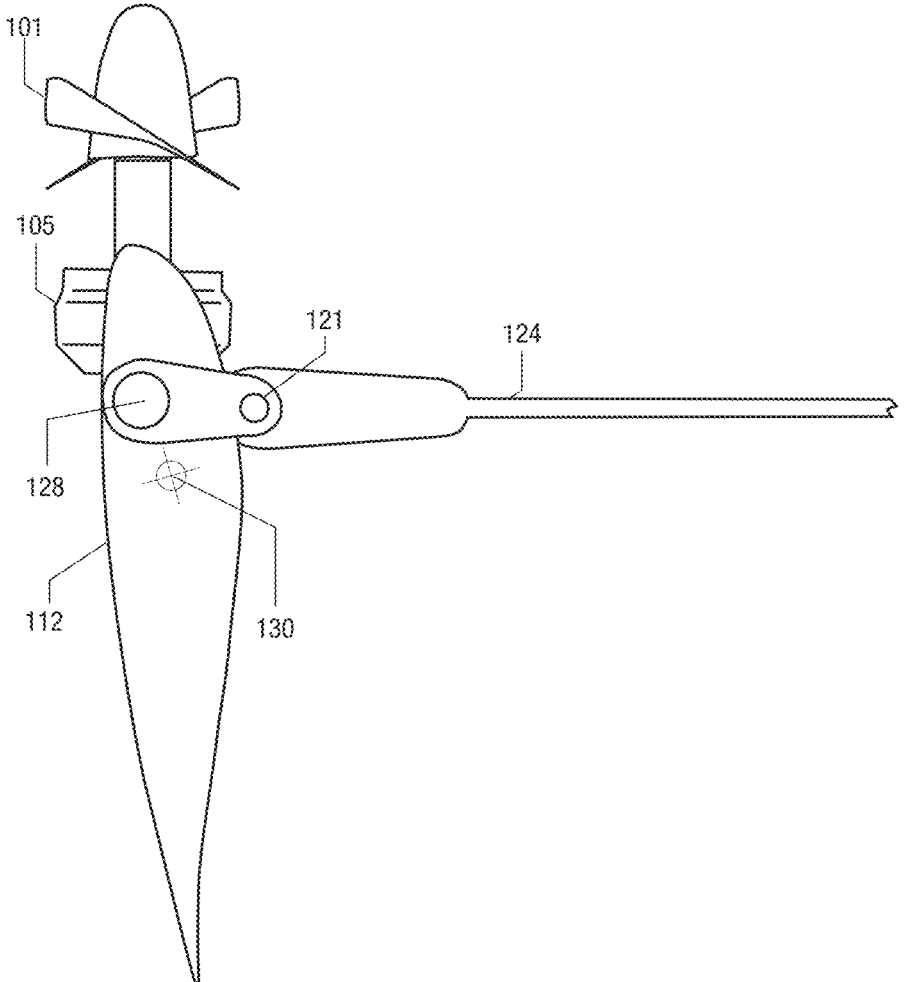
FIG. 7. Side view of forward wing in vertical flying mode, detail showing coupling, center of mass approximate position behind axis of rotation. Without horizontal airflow over its surface the wing hangs in a generally vertical attitude. Motor's rotation is independent from wing which rotates freely.
Figure 8:
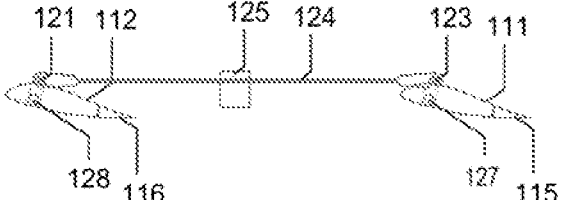
FIG. 8. Side view of wings assembly, detail showing wing coupling.
Figure 9:
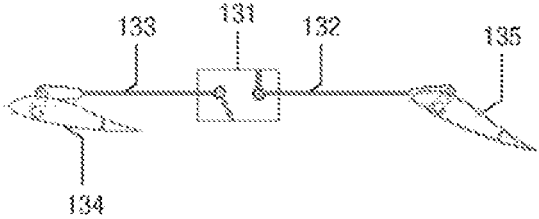
FIG. 9. Side view of wing assembly, detail showing wing coupling capable of adjusting relative angle of attack between fore and aft wings.

FIGS. 1-9 illustrate aircraft components in vertical flying and horizontal flying mode. Orthogonal views show propellers 101, 102, 103 104; electric motors driving propellers 105, 106, 107, 108; incident adjustable or free wings 109, 110, 111, 112; flight controls, aileron, aps or flaperons 113, 114, 115, 116; vertical/horizontal stabilizer 117, 118; elevator/rudder 119, 120; forward wing bridge couples wing rotation left and right wing sets 121; right and left side fore/aft wing connectors couples fore and aft wing. rotation 122, 124; aft wing bridge couples wing rotation left and right wing sets 123; prime power source, electronics bay, payload 125; Slot through which wing bridge transits fuselage, contains stop for wing positions top and bottom 126; Spar holding motors/spanwise axis of wing 127, 128; Approximate location of center of mass of free wing 130; Control system to adjust relative angle of attack between fore and aft wings 131; Linkage to aft wing 132; Linkage to fore wing 133; Fore wing 134; aft wing 135.

The invention claimed is:

1. An aircraft comprising:
free wings having control surfaces;
a fuselage;
a vertical stabilizer;
spars positioned both fore and aft, and on both left and right sides of the fuselage; and
multiple rotatably thrust producing rotors producing both vertical and horizontal thrust vectors,
wherein the free wings are mounted on each one of the spars such that they each are free to rotate about the spar on a span wise spar-centered axis without physical or mechanical coupling to the thrust producing rotors and the fuselage, the free wings are coupled front-to-back and side-to-side with each other such that a rotation induced in one free wing affects all free wings, and
a center of mass of each free wing is located at a distance behind the spar-centered axis of rotation;
the rotatably thrust producing rotors are configured with propellers, are mounted on ends of each one of the spars, and are rotatable from a horizontal to a vertical orientation.

2. The aircraft of claim 1 wherein the propellers are variable pitch.

3. The aircraft of claim 1 wherein a relative angle of attack of the fore and the aft wings can be adjusted.

4. The aircraft of claim 1 wherein a relative angle of attack of the left and the right wings can be adjusted.

5. An aircraft comprising:
an airframe comprising two or more spars positioned fore and aft on the airframe and extending laterally;
free wings having control surfaces are positioned on the spars such that they rotate about the spar on a spar-centered axis of rotation;
at least three rotatably from horizontal to vertical thrust producing rotors located at outermost ends of each one of the spars;
wherein the free wings are mechanically coupled front-to-back and side-to-side with each other such that a rotation induced in one free wing affects all free wings, and a center of mass of each free wing is located at a distance aft of the spar-centered axis of rotation, and
the free wings rotate about their respective spar without physical or mechanical coupling to a fuselage and the rotatably thrust producing rotors.

6. The aircraft according to claim 5, wherein each of the rotatably thrust producing rotors rotate about the respective spar without physical or mechanical coupling to the free wing.

7. The aircraft according to claim 5, wherein a relative angle of attack of the fore and the aft wings can be adjusted.

8. The aircraft according to claim 5, wherein a relative angle of attack of a left wing and a right wing can be adjusted.

9. The aircraft according to claim 5, wherein during horizontal flight, the free wings are positioned horizontally with the airframe and induce lift.

10. The aircraft according to claim 5, wherein during vertical flight, the free wings are positioned in a chord vertical attitude.

11. The aircraft according to claim 5, wherein the airframe is maintained in a generally horizontal attitude throughout vertical, transitional and horizontal flight modes.

12. The aircraft according to claim 5, wherein the at least three thrust producing rotors are configured to provide stability to the aircraft in vertical, transitional, and horizontal flight modes.

13. An aircraft comprising:

a fuselage comprising a vertical stabilizer, two sides, a floor, and at least two spars coupled thereto and extending laterally therefrom;

four rotatably from horizontal to vertical thrust producing rotors with one positioned on each spar;

free wings having control surfaces positioned on each spar having a spar-centered center of rotation, coupled front-to-back and side-to-side with one another and without physical or mechanical coupling to and between the fuselage and the rotatably thrust producing rotors;

wherein a center of mass of each free wing is located aft of the spar-centered center of rotation of the free wing, and each of the four rotatably thrust producing rotors is located outside of each free wing.

14. The aircraft according to claim 13, wherein the thrust producing rotors rotate about the spar without physical or mechanical coupling to the free wing.

15. The aircraft according to claim 13, wherein each thrust producing rotor comprises a propeller, and configured to tilt through a range of motion for vertical, transitional, and horizontal flight modes.

16. The aircraft according to claim 13, wherein during vertical flight, the free wings are positioned in a chord vertical attitude.

17. The aircraft according to claim 13, wherein the four rotatably thrust producing rotors are configured to provide stability to the aircraft in vertical, transitional, and horizontal flight modes.

18. The aircraft according to claim 9, wherein the free wings are positioned horizontally aerodynamically.

19. The aircraft according to claim 10, wherein during vertical flight, the free wings are positioned gravitationally in the chord vertical attitude.

* * * * *